United States Patent [19]
Richter et al.

[11] Patent Number: 4,776,607
[45] Date of Patent: Oct. 11, 1988

[54] TRAILER COUPLER WITH TAMPER RESISTANT LOCK MECHANISM

[75] Inventors: Karl E. Richter, Sheboygan; Edward W. Ebey, Nashotah, both of Wis.; Steven L. Permut, Huntington Woods; Stephen T. Bemis, Ann Arbor, both of Mich.

[73] Assignee: Fulton Manufacturing Corporation, West Allis, Wis.

[21] Appl. No.: 6,255

[22] Filed: Jan. 12, 1987

Related U.S. Application Data

[63] Continuation of Ser. No. 760,597, Jul. 30, 1985, abandoned.

[51] Int. Cl.$^4$ .............................................. B60D 1/06
[52] U.S. Cl. ...................................... 280/507; 280/513
[58] Field of Search ............... 280/504, 506, 507, 508, 280/509, 511, 512, 513, 434

[56] References Cited

U.S. PATENT DOCUMENTS

| | | | |
|---|---|---|---|
| 1,255,384 | 2/1918 | Cadman | 280/506 X |
| 2,891,806 | 6/1959 | Haverly et al. | 280/511 |
| 3,061,334 | 10/1962 | Everett et al. | 280/513 |
| 4,360,217 | 11/1982 | Pittman | 280/513 |
| 4,556,233 | 12/1985 | Richter et al. | 280/513 |

FOREIGN PATENT DOCUMENTS

| | | | |
|---|---|---|---|
| 617219 | 3/1961 | Canada | 280/508 |
| 891501 | 9/1953 | Fed. Rep. of Germany | 280/513 |
| 459394 | 1/1937 | United Kingdom | 280/513 |
| 1487736 | 10/1977 | United Kingdom | 280/511 |

Primary Examiner—John J. Love
Assistant Examiner—Charles R. Watts
Attorney, Agent, or Firm—Steven L. Permut; Malcolm L. Sutherland

[57] ABSTRACT

A coupler for a ball type hitch has a body member that includes a socket portion and a closure mechanism that is slidably mounted on the body member for movement between the open position, a closed position, and a third overshoot position. The closure mechanism includes a lower retaining plate and a latch plate which automatically latches when the closure mechanism achieves the closed position. A spring biases the closure mechanism from the open position to the closed position and third position. The closure mechanism is retained in the closed position when the coupler is engaged to a properly sized hitch ball. The closure mechanism is free to move to the third overshoot position when the coupler is engaged to an undersized ball. Visual indicators exit the coupler body member when the closure mechanism is in the open or third overshoot positions. The retainer plate includes a lock receiving aperture for receiving a lock that prevents unauthorized opening of the coupler.

13 Claims, 3 Drawing Sheets

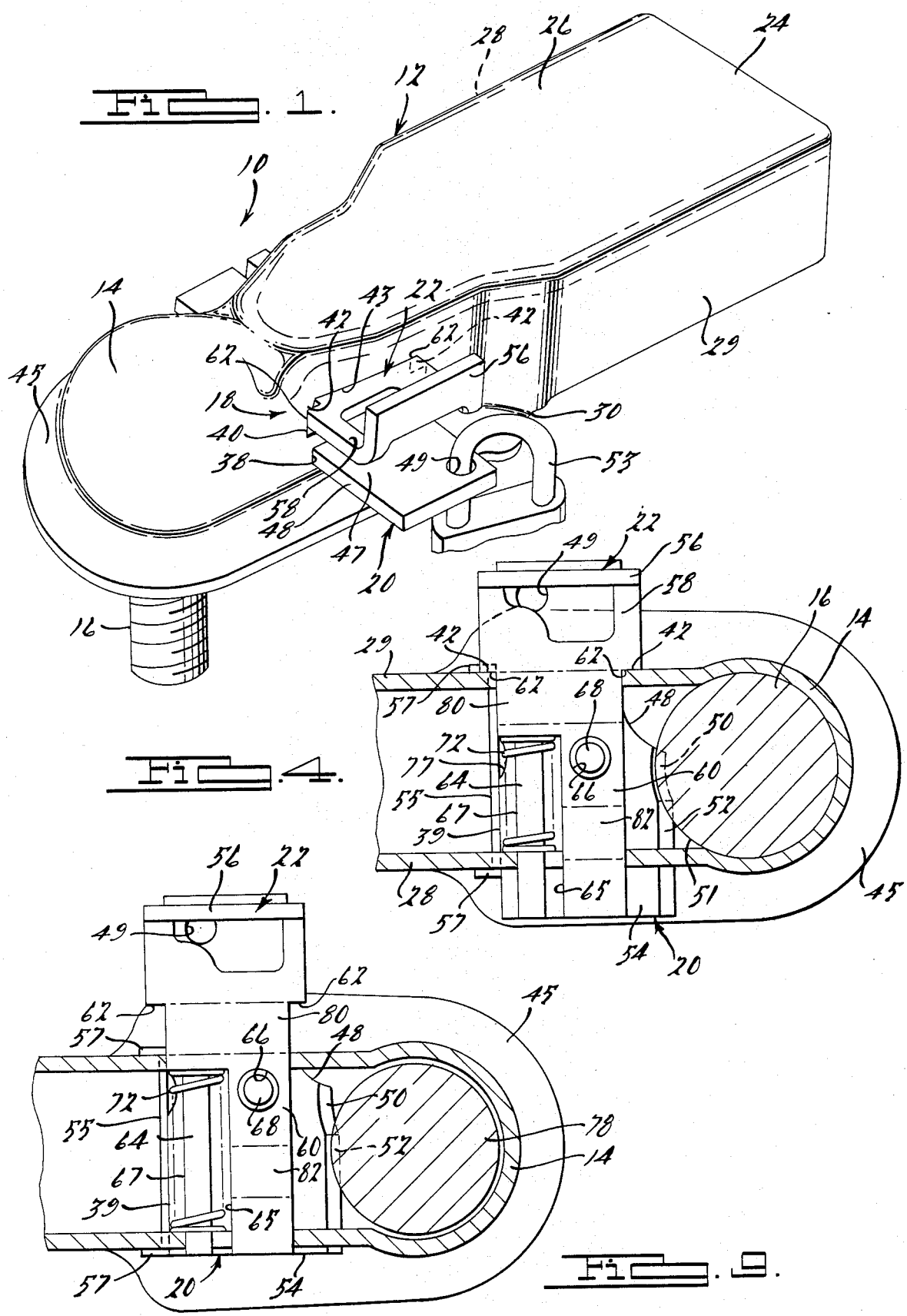

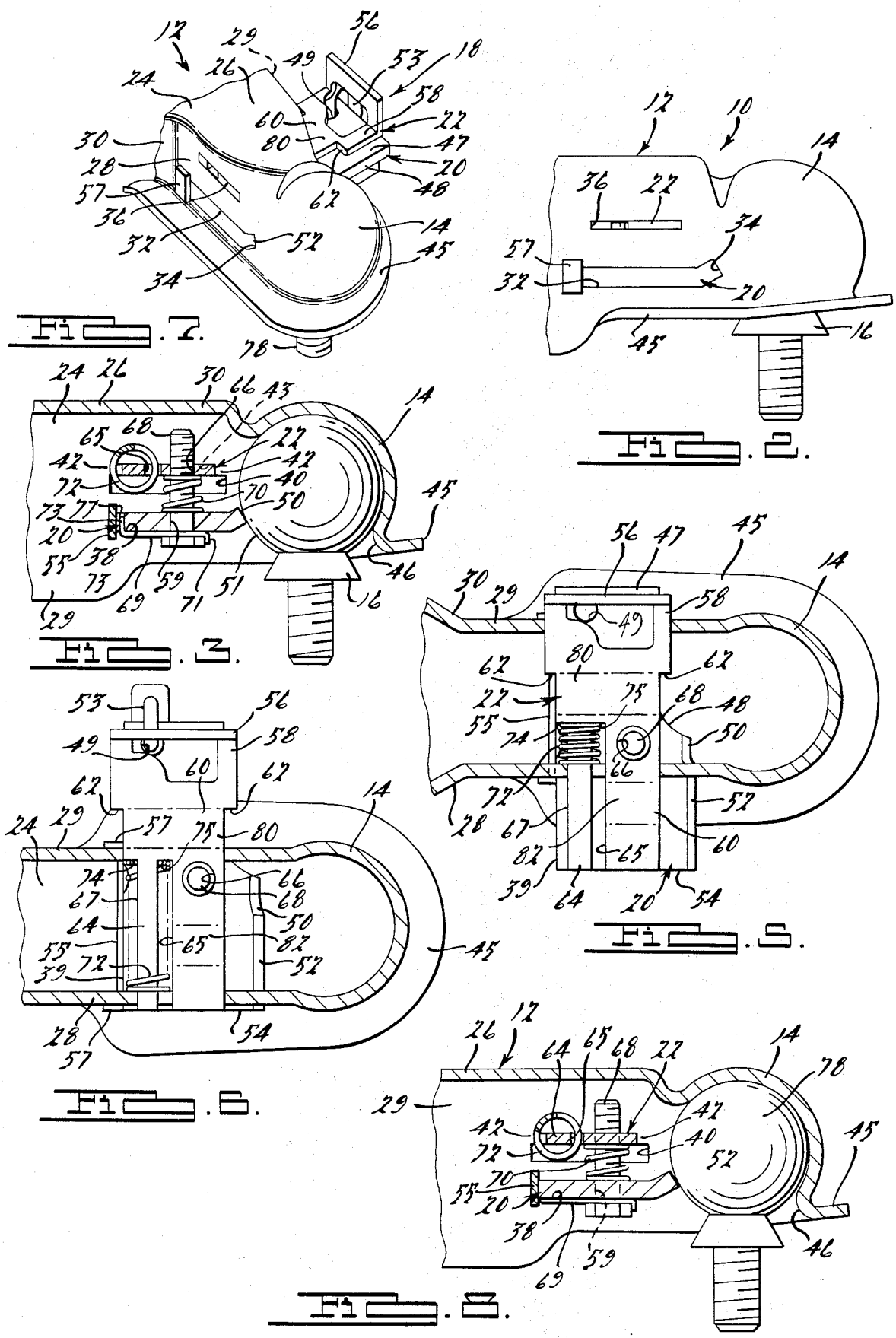

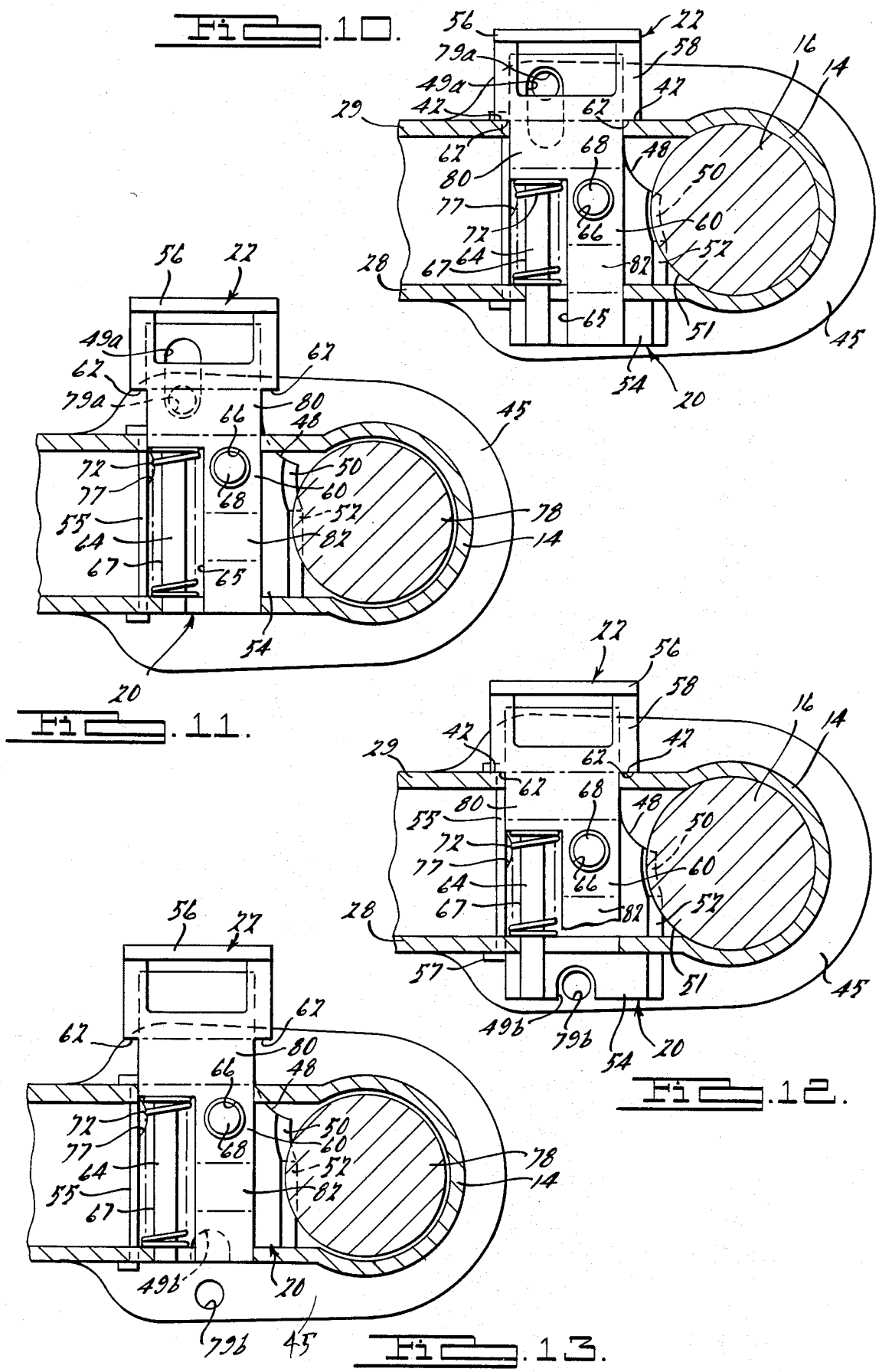

4,776,607

TRAILER COUPLER WITH TAMPER RESISTANT LOCK MECHANISM

This is a continuation of application Ser. No. 760,597, filed 7/30/85, now abandoned.

BACKGROUND OF THE INVENTION

1. Technical Field

This invention relates to couplers for trailers and the like. More particularly, the invention relates to a coupler for use with a ball type hitch.

2. Disclosure Information

Couplers generally include a ball socket portion and an operable closure mechanism that clamps a ball hitch within the socket portion. Commonly each coupler is appropriately sized to fit a particular sized ball hitch. U.S. Pat. No. 3,794,356 issued to Hollis, Jr. on Feb. 26, 1974 discloses a coupler that includes a slidable closure mechanism shiftable between a closed and open position. The closure mechanism has a latch that retains the mechanism in the closed position.

U.S. Pat. No. 4,360,217 issued to Pittman on Nov. 23, 1982 discloses a coupler closure mechanism including a horizontal sliding plate that retains the ball hitch in the socket. The latching assembly can be incorporated in various bodies to clamp varying size balls.

What is needed is a self-closing coupler that indicates when a coupler is in the open position, when it is not engaging the hitch, or if it is engaging an undersized hitch and furthermore be resistant to unauthorized opening.

SUMMARY OF THE INVENTION

In accordance with one aspect of the invention, a coupler has a body member wherein the body member has a socket portion for receiving a hitch, preferably one that incorporates a ball. A horizontally disposed retainer plate is mounted on the body member for movement between the open position, a closed position, and a third overshoot position beyond the closed position. The plate, when in the third overshoot position, visibly indicates that the coupler is engaging an undersized hitch ball or is otherwise disengaged from a hitch ball when in the third position. The plate has a lock section that, when engaged, prevents the plate from moving to the open position.

Preferably, the body member has opposing sidewalls with a horizontal slot through each wall. The retainer plate is mounted for horizontal movement through the slots. The retainer plate preferably has an end section with a recessed front edge such that when the retainer plate is in the open position, the recessed front edge is aligned with the socket to allow a hitch ball to enter and exit the socket. The retainer plate has an engaging middle section with a forwardly curved edge extending from the recessed front edge such that when the retainer plate is in the closed position, the curved engaging edge abuts a properly sized ball and prevents the retainer plate from further movement toward the third overshoot position. In addition, the engaging edge prevents the ball from exiting the socket. A straight edge is adjacent and forwardly positioned from the engaging edge such that when an undersized ball is in the socket, the retainer plate is free to slide to the third overshoot position and the straight edge prevents the undersized ball from freely exiting the socket portion.

The lock section, preferably an aperture through the retainer plate, allows the plate to move between the closed position and the third position while still preventing motion to the open position when the aperture is engaged with a lock.

A horizontal latch plate is positioned in proximity and parallel to the retainer plate and operably connected thereto for sliding movement therewith. The latch plate has a latch mechanism to latch the closure mechanism in the closed position and prevent it from inadvertently sliding to the open position. Preferably, the latch plate is biased in a direction transverse to the direction of movement of the latch plate and retainer plate member to automatically latch the closure mechanism when it is in the closed position. The latch plate is preferably positioned vertically above the retainer plate and extends through a second pair of slots through the side walls of the body member with a first spring biasing the latch plate upwardly.

The latch plate also has a section mounting a second spring which biases both plates away from the open position. The latch plate also has a first indicator section which is visibly positioned outside the body member only when the closure mechanism is in the open position. The latch plate has a second indicator section also visibly positioned to the exterior side of the body only when the plates are in the third overshoot position.

More broadly, this invention relates to a coupler that has a closure mechanism movable between three positions: an open position, a second closed position, and a third overshoot position that indicates an undersized ball hitch is being used or the coupler is disengaged from the ball hitch while incorporating a lock section to resist unauthorized opening even when the latch plate may be tampered with and disconnected from the retainer plate.

BRIEF DESCRIPTION OF THE DRAWING

Reference now will be made to the accompanying drawings in which:

FIG. 1 is a left front perspective view of the preferred embodiment of a coupler according to the invention in the closed position engaging a properly sized hitch ball and locked in place by a padlock;

FIG. 2 is a right side elevational view of the coupler shown in FIG. 1;

FIG. 3 is a partially segmented side elevational view of the coupler;

FIG. 4 is a segmented top elevational view of the coupler;

FIG. 5 is a view similar to FIG. 4 with the closure mechanism moved to the open position and the hitch ball removed;

FIG. 6 is a view similar to FIG. 5 with the latch mechanism moved to the third position and a padlock secured to the coupler;

FIG. 7 is a fragmentary right perspective of the coupler shown coupler to an undersized hitch ball with a padlock engaging the coupler;

FIG. 8 is a view similar to FIG. 3 showing the coupler in the third position engaging an undersized hitch ball;

FIG. 9 is a view similar to FIG. 4 showing the coupler engaging an undersized hitch ball;

FIG. 10 is a view similar to FIG. 4 showing a second embodiment;

FIG. 11 is a view similar to FIG. 10 with the coupler engaging an undersized hitch ball;

FIG. 12 is a view similar to FIG. 10 showing a third embodiment; and

FIG. 13 is a view similar to FIG. 12 with the coupler engaging an undersized hitch ball.

DETAILED DESCRIPTION OF THE PREFERRED EMBODIMENT

Referring to FIGS. 1-4, a coupler 10 has a body member 12 that includes a socket portion 14 that can receive a hitch ball 16 of a conventional hitch. A closure mechanism 18 includes a lower horizontal retainer plate 20 and a upper horizontal latch plate 22 that are mounted in a transverse direction across the body member 12.

In more detail, the body member 12, a one piece stamping, has a channel section 24 that can be secured in a conventional fashion bolted to a tongue (not shown). The channel section 24 has a top wall 26 and two side walls 28 and 29. The side walls 28 and 29 converge toward each other at an intermediate section 30. The side wall 28 has a lower slot 32 that has an upwardly curved forward end 34 and an upper slot 36 vertically spaced above the lower slot 32. Side wall 29 has a straight lower slot 38 and a stepped upper slot 40 with shoulders 42 formed at each edge of the upper section 43 of slot 40. The lower slots 32 and 38 are aligned and located toward the bottom of walls 28 and 29 to slidably mount retainer plate 20. Slots 36 and 40 are aligned to slidably mount latch plate 22. Socket portion 14 is forwardly positioned of the intermediate section 30. A lower lip 45 outwardly extends from the intermediate section 30 and socket portion 14. The lower lip 45 has a rounded cam section 46 thereunder.

The retainer plate 20 is slidably mounted in the lower slots 32 and 38 for movement in a horizontal direction transverse to the longitudinal axis of the body member. The retainer plate 20 has a narrow section 47 which slidably fits within slot 38. The narrow section 47 has a lock receiving aperture 49 that can receive a lock 53. The narrow section 47 has a recessed front edge 48 that allows the ball 16 to enter and exit socket 14. The front edge 48 merges into a forwardly curved engaging edge 50. The curved engaging edge 50 is curved to abut against the spherical surface 51 of a properly sized hitch ball 16. The curved engaging edge 50 abuts surface 51 of hitch ball 16 at a position below the horizontal equater of the hitch ball 16. Behind the engaging edge 50, the plate 20 has an aperture 59 therethrough. the edge 50 merges into the front retaining edge 52 of a wide portion 54 which fits within the lower slot 52. Both the engaging edge 50 and front retaining edge 52 are inclined upwardly to abut a lower portion of a ball surface. A rear edge 39 of the plate 20 abuts against a thrust plate 55 that is welded in place at its two ends 57.

The latch plate 22 has a vertical extending handle 56 integral with a wide section 58. The latch plate 22 also has a narrow section 60 with shoulders 62 formed between section 60 and wide section 58. The narrow section 60 has an aperture 66 therethrough. A bolt 68 threadably engages aperture 59 in the retainer plate 20 and freely passes through aperture 66 in the latch plate. The bolt 68 is locked in place by a lock clip 69 that has a lip 71 bent to abut the bolt 68 and a distal end 73 inserted in notch 77 at rear edge 39 of the retainer plate 20. A spring 70 is interposed between the two plates about the bolt 68 to upwardly bias the latch plate 22. The latch plate 22 also has a cutaway 67 and a slot 65 to form a post section 64. A second spring 72 is mounted on post section 64 interposed between side wall 28 and shoulders 74 and 75 in plate 22 for biasing both plates toward wall 29 such that the latch plate handle 56 must be manually pushed toward the open position against the bias of spring 72. If desired, spring 72 can comprise two coaxially mounted coils.

As shown in FIG. 5, when the coupler is in the open position, the latch plate 22 has its wide section 58 seated within the lower section of upper slot 40. The front recessed edge 48 of the retainer plate 20 opens up the socket portion 14 to allow the ball 16 to be received within the socket portion or to be removed therefrom. Narrow section 60 can have a label section 82 exposed to the exterior of the coupler appropriately marked to indicate the coupler is in the open position. When a properly sized ball 16 is received in the socket portion, the handle 56 is then released and the spring 72 automatically moves the retaining plate 20 to its closed position wherein the curved engaging edge 50 abuts the ball hitch 16 as shown in FIGS. 3 and 4. The coil spring 72 maintains a bias on the retainer plate 22 to the closed position.

In addition, the closure mechanism 18 automatically latches in the closed position. The wide section 58 of plate 22 exits from the upper slot 40 to allow the narrow section 60 to move upwardly by the bias of spring 70 into the upper section 43 of slot 40 such that the shoulders 42 of the wall and the shoulder 62 of the latch plate 22 are adjacent each other as shown in FIGS. 1 and 4. Before the latch plate can be moved toward the open position against the bias of spring 72, the latch plate 22 must be pressed downwardly against the upward bias of spring 70.

Furthermore, aperture 49 is positioned adjacent lip 45 such that when aperture 49 receives padlock 53, the latch and retainer plate cannot be moved to the open position due to the locking interference between lock 53 and lip 45. Even if there is unauthorized tampering with the coupler and the bolt 66 is disengaged, the retainer plate 20 still maintains the second position and cannot be moved to the open position. The lock 53 abuts the flange 45 to prevent such unauthorized opening of the coupler.

If the coupler is secured on a moderately undersized ball 78 as shown in FIGS. 7-9, the engaging edge 50 will not abut the ball such that the spring 72 will continue to bias both plates toward the right (with reference to FIG. 7) and continue to move the narrow section 60 of latch plate 22 through the slot 40. The movement of latch plate 22 and retainer plate 20 between the closed and third positions is significantly larger than the difference in size between ball 16 and ball 78. The narrow section 60 then becomes exposed to the exterior side of side wall 29 as shown in FIGS. 7 and 9. The exposed narrow section 60 can have a label section 80 appropriately marked to indicate that the closure mechanism is in the third position. As shown in FIG. 8, if the undersized ball 78 is only moderately undersized, (eg. a 1⅞ inch size is used instead of a properly sized 2 inch ball) the front retaining edge 52 presents an obstacle against the ball 78 from freely exiting the socket portion 14 while the label section 80 simultaneously provides a visable indicator that the coupler is engaging an undersized ball. Even if the padlock 53 is secured in aperture 49, as shown in FIG. 7, the coupler can still function and move to the third position.

After the coupler is disengaged from the hitch, the closure mechanism is biased to the third position, as shown in FIG. 6. The padlock 53 can be engaged to the retainer plate 20 when there is no ball engaged to the coupler as shown in FIG. 6. The padlock 53 prevents the coupler from any unauthorized opening and securement to a proper sized ball.

If per chance the coupler is merely placed upon the hitch ball while the closure mechanism is in the third position, the inner rounded cam section 46 and retaining plate 20 rests upon an extremely high portion of the hitch ball 16 such that when any horizontal force is exerted on the coupler or hitch, the coupler and hitch immediately disengage.

Alternatively, referring to FIGS. 10 and 11, retainer plate 20 can have a lock receiving elongated aperture 49a alignable over an aperture 79a in flange 45. The elongated aperture 49a is positioned to allow the retainer plate 20 to slide to the third position as shown in FIG. 11, but prevents motion to the open position if a padlock engages both apertures 49a and 79a.

Alternatively, now referring to FIGS. 12 and 13, a lock receiving notch 49b is located behind front retaining edge 52 at an end of the plate 20 opposite handle 56. An aperture 79b through flange 45 is to be aligned with notch 49b when the coupler is in the closed position as shown in FIG. 12. The notch 49b allows the retainer plate 20 to slide to the third position as shown in FIG. 13 but prevents motion to the open position if a padlock engages the aperture 79b and notch 49b.

In this fashion, a coupler has a closure mechanism that indicates when an undersized ball is being used as well as when the closure mechanism is in the open or closed position.

In addition, a coupler mechanism provides for automatic closing of the coupler on a properly sized ball and has secondary latching capabilities to prevent the coupler from undesirably opening.

Futhermore, a coupler is provided with the above features that is also resistant agaisnt unauthorized opening by being able to have the retainer plate locked and prevented from returning to the open position. The resistance to opening deters either unauthorized disengagement of the ball or unauthorized engagement to the ball.

Variations and modifications of the present invention are possible without departing from its scope and spirit as defined by the appended claims.

The embodiments of the invention in which an exclusive property or privilege is claimed are defined as follows:

1. A coupler for use with a hitch ball, said coupler comprising:
    a body member having a socket portion for receiving said hitch ball;
    a retainer plate slidably mounted on said body member for horizontal movement in a transverse direction with respect to a longitudinal axis of said body member between an open position and a closed position;
    a latch plate slidably mounted on said body member for movement in the same direction as said retainer plate;
    said latch plate being connected to said retainer plate for movement therewith;
    biasing means for biasing said latch plate in a direction transverse to the said direction of motion of said retainer plate such that when said retainer plate is in said closed position, said biasing means moves said latch plate to a latched position with respect to said body member;
    said retainer plate includes an aperture for receiving a lock for preventing said retainer plate from returning to said open position when said retainer plate engages said lock.

2. A coupler as defined in claim 1 wherein said retainer plate and latch plate are vertically spaced from each other.

3. A coupler as defined in claim 2 wherein said latch plate is positioned vertically above said retainer plate and is biased away from said retainer plate.

4. A coupler as defined in claim 2 wherein said body member has two spaced apart side walls;
    each side wall has a slot for slidably receiving said retainer plate;
    each side wall has a second slot for sidably receiving said latch plate;
    one of said second slots is stepped with a narrower section sized to receive a narrow portion of said latch plate;
    said biasing means biasing said narrow portion of said plate into said narrow section of said stepped slot; and
    said latch plate having outwardly extending shoulders adjacent said narrow portion to engage said side wall adjacent said narrow section of said stepped slot to latch said latch plate and retainer plate in said closed position.

5. A coupler as defined in claim 4 wherein said aperture in said retainer plate is positioned such that when said plate is in said closed position said aperture is exterior to and ajacent said body member to allow said plate to move to said third position but prevent movement to said open position when engaged by a lock.

6. A coupler as defined in claim 5 wherein said body member has an exterior flange extending from said side walls; said aperture in said plate is positioned exterior to said flange such that when a lock engages said aperture said lock abuts said flange to prevent movement of said plate to said open position.

7. A coupler as defined in claim 5 wherein said body member has an exterior flange extending from said side walls and having an aperture extending therethrough; said aperture in said retainer plate is elongated and part of it is aligned over said aperture in said flange when said coupler is in the closed position; said aperture elongated along the length of said plate to allow movement to the third position when another part of said elongated aperture becomes aligned over said aperture in said flange.

8. A coupler as defined in claim 5 wherein:
    said retainer plate abuts a properly sized hitch ball in said socket when in said closed position;
    said retainer plate and latch plate are free to move from said open position to a third position beyond said closed position with said latch plate having its narrow section exiting said stepped slot and providing a visible indication when said retainer plate and latch plate are in the third position.

9. A coupler as defined in claim 8 wherein:
    a second biasing means biases said retainer plate and latch plate to said third position.

10. A coupler for use with a hitch system, said coupler comprising:
    a body member having a socket portion for receiving said hitch system;

a closure means movably mounted on said body member for movement to an open position, closed position, and a third position, such that said hitch system can enter and exit said socket portion when said closure means is in an open position, said hitch system being locked in said socket portion when said closure means is in said closed position, and said closure means providing a visible indication that said socket portion has received a hitch system below a predetermined size for said coupler or is disengaged from said hitch system by having discrete motion to said third position which is discrete and spaced apart from said closed position, the closed and third position being significantly more spaced apart than a difference in linear dimensions between a predetermined sized hitch system for said coupler and a hitch system slightly below said predetermined size;

said closure means having a lock receiving section for preventing said closure means from returning to the open position when in the closed or third position when a lock engages said lock receiving section;

a horizontally positioned and slidably movable retainer plate;

said retainer plate having a recessed front edge aligned with said socket portion when in said open position to allow a hitch system to enter and exit said socket portion;

said retainer plate having an engaging front edge aligned with said socket for engaging a predetermined sized hitch system for said coupler when in said closed position;

biasing means for biasing said retainer plate away from said open position and to said closed position when said predetermined sized hitch system is received in said socket;

said lock receiving section includes an aperture in said retainer plate;

said plate being mounted through opposing side walls in said body member and is mounted for slidable movement transverse to said side walls; and said aperture in said retainer plate being positioned such that when said plate is in said closed position said aperture is exterior to and adjacent said body member to allow said plate to move to said third position but prevent movement to said open position when engaged by a lock.

11. A coupler as defined in claim 10 wherein said body member has an exterior flange extending from said side walls; said aperture in said plate is positioned exterior to said flange such that when a lock engages said aperture said lock abuts said flange to prevent movement of said plate to said open position.

12. A coupler as defined in claim 10 wherein said body member has an exterior flange extending from said side walls and having an aperture extending therethrough; said aperture in said retainer plate is elongated and part of said aperture is aligned over said aperture in said flange when said coupler is in the closed position; said aperture elongated along the length of said plate to allow movement to the third position when another part of said elongated aperture becomes aligned over said aperture in said flange.

13. A coupler for use with a hitch system, said coupler comprising:

a body member having a socket portion for receiving said hitch system;

a closure means movably mounted on said body member for movement to an open position, closed position, and a third position, such that said hitch system can enter and exit said socket portion when said closure means is in an open position, said hitch system being locked in said socket portion when said closure means is in said closed position, and said closure means providing a visible indication that said socket portion has received a hitch system below a predetermined size for said coupler or is disengaged from said hitch sytem by having discrete motion to said third position which is discrete and spaced apart from said closed position, the closed and third position being significantly more spaced apart than a difference in linear dimensions between a predetermined sized hitch system for said copler and a hitch system slightly below said predetermined size;

said closure means having a lock receiving section for preventing said closure means from returing to the open position when in the closed or third position when a lock engages said lock receiving section;

a horizontally positioned and slidably movable retainer plate;

said retainer plate having a recessed front edge aligned with said socket portion when in said open position to allow a hitch system to enter and exit said socket portion;

said retainer plate having an engaging front edge alinged with said socket for engaging a predetermined sized hitch system for said coupler when in said closed position;

biasing means for biasing said retainer plate away from said open position and to said closed position when said predetermined sized hitch system is received in said socket;

said body member has an exterior flange extending from said side walls and having an aperture extending therethrough;

said lock receiving section includes a notch in the retainer plate being positioned over said aperture in said flange when said coupler is in the closed position and said notch having its open end positioned to allow said retainer plate to move to the third position from said closed position when a lock engages said notch and aperture to prevent movement of said plate to said open position

* * * * *